United States Patent [19]

Martinez-Vera et al.

[11] Patent Number: 4,556,417
[45] Date of Patent: Dec. 3, 1985

[54] PROCESS FOR THE DIRECT REDUCTION OF IRON ORES

[75] Inventors: Enrique R. Martinez-Vera; Alberto Bustani-Adem, both of Monterrey, Mexico

[73] Assignee: Hylsa, S.A., Monterrey, Mexico

[21] Appl. No.: 495,422

[22] Filed: May 17, 1983

[51] Int. Cl.$^4$ ............................................. C21B 13/02
[52] U.S. Cl. ........................................................ 75/35
[58] Field of Search ............................................. 75/35

[56] References Cited

U.S. PATENT DOCUMENTS

| | | | |
|---|---|---|---|
| 2,627,455 | 2/1953 | Berg | 48/86 |
| 3,136,623 | 6/1964 | Mader et al. | 75/34 |
| 3,375,098 | 3/1968 | Marshall | 75/35 |
| 3,765,872 | 10/1973 | Celada et al. | 75/34 |
| 3,779,741 | 12/1973 | Celada et al. | 75/35 |
| 4,032,120 | 6/1977 | Beggs | 266/159 |
| 4,042,226 | 8/1977 | Beggs | 266/156 |
| 4,046,557 | 9/1977 | Beggs | 75/26 |
| 4,049,440 | 9/1977 | Beggs | 75/35 |
| 4,054,444 | 10/1977 | Clark et al. | 75/35 |
| 4,067,728 | 1/1978 | McKay | 75/35 |
| 4,087,275 | 5/1978 | Beggs | 75/35 |
| 4,099,963 | 7/1978 | McKay | 75/35 |
| 4,150,972 | 4/1979 | Price-Falcon et al. | 75/35 |
| 4,248,623 | 2/1981 | Pabst et al. | 75/35 |
| 4,253,867 | 3/1981 | Price-Falcon et al. | 75/35 |
| 4,261,734 | 4/1981 | Price-Falcon et al. | 75/35 |
| 4,268,303 | 5/1981 | Kaneko et al. | 75/34 |

FOREIGN PATENT DOCUMENTS 799551  8/1958  United Kingdom .

Primary Examiner—Melvyn J. Andrews
Attorney, Agent, or Firm—Curtis, Morris & Safford

[57] ABSTRACT

The present invention relates to a process for the production of metallic iron through direct reduction of iron ores and particularly to an optimized process which permits operation at higher reducing temperatures with minimized problems of sinterization and agglomeration of iron ore particles. It is also an object of the present invention to provide a process wherein the required size of the reducing gas generating unit is reduced. Both objects are preferably achieved by means of injecting only natural gas, or a similar methane-containing gas into the cooling loop of the direct reduction process and venting a portion of the cooling gas from the cooling zone to the reducing zone (preferably, on the order of 1% to 2% of the methane content of the cooling gas in relation to the volume flow of the reducing gas).

20 Claims, 4 Drawing Figures

FIG. I

PROCESS FOR THE DIRECT REDUCTION OF IRON ORES

The present invention relates to a process for the production of metallic iron through direct reduction of iron ores and particularly to an optimized process which permits operation at higher reducing temperatures with minimized problems of sinterization and agglomeration of iron ore particles. It is also an object of the present invention to provide a process wherein the required size of the reducing gas generating unit is reduced.

BACKGROUND OF INVENTION

Reduction processes with moving bed reactors are widely known in the art. Generally, they comprise two zones, the first, in the upper part of the reactor, is the so-called reduction zone where iron ore flowing downwardly by gravity and a stream of upwardly flowing high temperature reducing gases are contacted countercurrently, said reducing gases being gas mixtures largely composed of $H_2$ and CO. In this zone preheating and reduction of iron ore are carried out.

In the second zone, at the lower part of the reactor, is the so-called cooling zone, where the descending hot and reduced iron ore particles are contacted countercurrently with an ascending flow of cold gas in order to cool the reduced iron ore particles before being discharged to the atmosphere. This cooling is necessary to avoid the reoxidation of the reduced particles with the oxygen present in the air.

The productivity of the reduction zone is determined by the time needed to reduce the iron ore particles, the smaller the residence time the greater the production that is achieved by the same reduction zone.

It is known that the higher the temperature of the reducing gas at the inlet of the reduction zone, the smaller the residence time of the solids in this zone. The above happens because the kinetics of the iron ore reduction reactions with $H_2$ and CO depends strongly on the temperature. The higher the temperature, the faster the rate of reaction, and the higher the productivity of the process.

Usually direct reduction processes operate at a temperature between 750° and 900° C. at the inlet of the reduction zone.

The main limitation for further increasing this temperature is the tendency of sinterization and agglomeration shown by most of the highly reduced iron ores when they reach temperatures higher than 900° C.

This limitation is particularly strong when dealing with iron ore particles rich in iron, especially in the form of pellets, because pellets have a high iron content and a low gangue content.

Nowadays, it is preferred to use pellets with a high iron content as feedstock for direct reduction processes. The main reason is that the pellets are, in general, more easily reduced than lump ores. This quality helps in obtaining a highly metallized product. Additionally, pellets are also more resistant to mechanical degradation during the reduction process and for this reason, they generate fewer fines than lump ores. It is also possible to vary, within certain limits, the chemical composition of the gangue in order to optimize the use of reduced material as a feedstock for electric arc furnaces.

These days the tendency in the iron and steel industry is to use pellets with an iron content higher than 67%. This aggravates the agglomeration problem, since it is known that if the iron content is higher, the pellets sinterization and agglomeration problems are greater.

When solids agglomeration happens in moving bed reactors, serious problems of solids flow and gas flow distribution are encountered. This causes loss in process control and erratic product quality.

Several solutions for solving the problem of agglomeration in moving bed reactors for the direct reduction of iron ores have been proposed. The most obvious is the use of mechanisms that destroy said agglomerates. This is a non-optimized solution, since these mechanisms are usually located in the path of solids flow causing disturbances to said flow, aggravating the problem. They are also subject to severe conditions of abrasion and high temperature. These mechanisms are complex and expensive.

Another known manner of solving the problem of pellets agglomeration when operating at high temperatures, is to charge the reactor with mixtures of pellets and lumps or pellets and an inert material of irregular shape. In both cases the shape effect is present which helps to minimize the problem of agglomerates.

In the case of lump ores there is the disadvantage that generally lumps are less reducible than pellets and also produce a greater quantity of fines. Additionally, there are few lump ores in the world that can be utilized in direct reduction processes. For this reason it is not always convenient to design the operation of direct reduction plants on the basis of using mixtures of pellets and lumps.

The disadvantage of using mixtures of inert materials and pellets is the need of separating the inert material from the product and the decrease in reactor productivity.

Due to the advantages of using pellets, e.g. high reducibility, low gangue, and lower fines generation; there is the need for a direct reduction process which consistently permits its operation with 100% pellets having a high content of iron, higher than 67%, at reduction temperatures above 900° C., without problems of sintering and agglomeration.

U.S. Pat. No. 4,268,303 discloses a direct reduction process which permits operation at high temperatures without problems of agglomeration. The process disclosed in this patent is based on a moving bed reactor having two reduction zones without a cooling zone.

In the first zone, the reduction takes place at temperatures in the order of 950° to 1200° C. with gases having a high methane content (15-40%).

According to the teachings in this patent, it is possible to carry out the first reduction stages (30 to 80%) at high temperatures and when the methane content is high, because the reduction reaction of methane is highly endothermic.

In the second zone, the reduction is carried out at temperatures in the range between 750° and 950° C. with gases having a lower methane content (2-7%).

The principal limitation of this process is the extreme level to which the temperature of the gases with high methane content must be raised in order to carry out the reduction. On one hand, the materials needed for operating heaters at temperatures in the order of 1200° C. are very specialized and expensive, and on the other hand, at these temperatures pyrolisis of methane is favored (causing problems of high carbon deposition which translate to operating problems of the reactor).

In this patent the high agglomerating tendency of pellets having high iron content is not mentioned nor is any way disclosed for solving this problem.

The present invention discloses a process based on a moving bed reactor having three zones, a reduction zone in the upper part of the reactor, a cooling zone in the lower portion of the reactor and an intermediate zone separating the above mentioned zones.

In the reduction zone, the reduction is carried out at temperatures in the order of 950° C. with a gas having a content of methane between 4 and 10%, of hydrogen between 60 and 70%, and of carbon monoxide between 2 and 15%.

In the lower part of the reactor, the product cooling zone is located. Said cooling is effected in a closed loop comprising said lower part of the reactor, a quench cooler and a compressor. A stream of natural gas, mainly composed of methane, serves as make-up to this loop. Since there is no gas outlet, external to the reactor, in this cooling loop; the methane injected to said loop causes methane to flow therefrom through the intermediate zone to the reduction zone.

In the intermediate zone the methane coming from the cooling zone is mixed with a portion of the hot reducing gas injected to the reduction zone.

The cooling gas flowing from the cooling zone has a temperature between 400° and 600° C. When the cooling gas is contacted in the intermediate zone with the oxidant elements present in the hot reducing gas; the highly endothermic reforming reactions of methane are promoted. Due to these reactions, the temperature of the solids decreases rapidly, because the heat of reaction is provided by the descending mass of solids. This sudden cooling of solids avoids agglomeration of the highly metallized pellets and particles, because the time during which they are at high temperatures is very short.

In this way the agglomeration of particles of highly metallized pellets is avoided, without the need of having a high methane content in the reducing gas which implies a reduction zone at extreme temperatures (1200° C.).

In the present invention the reduction takes place in a single stage with a mixture of hydrogen and carbon monoxide, said mixture having a reduction velocity higher than that of methane.

The reforming that takes place in the intermediate zone avoids the formation of agglomerates and makes possible a decrease in capacity of the natural gas reforming unit. U.S. Pat. Nos. 4,046,557 and 4,049,440 disclose natural gas injection to the cooling loop of a reduction process with a moving bed reactor. Nevertheless, the natural gas injection is always carried out with a supplementary injection of recirculated cooled reducing gas. The main object of the aforementioned patent is to utilize recirculated gas from the reduction loop as a cooling gas without affecting said reduction loop. The natural gas is injected in order to regenerate the reducing potential of the recirculated gas by reforming the natural gas in the cooling loop and then permitting a portion of this gas to upflow to the reduction loop. In the U.S. Pat. Nos. 4,046,557 and 4,049,440 the amount of methane injected to the cooling zone and then reformed in the reactor does not contribute to decrease the reforming unit capacity, because the amount of hot reformed gas flowing from said reformer is fixed by the temperature requirements at the reduction zone inlet. This temperature is fixed by the mix of the hot reducing gas with the cool recirculated gas. It is not possible to decrease too much the hot gas flow coming from the reforming unit without lowering the temperature at the reduction zone inlet. Thus, injecting natural gas to the cooling loop does not make it possible as a practical matter to decrease the reforming unit capacity. In the process according to the present invention, the reformed gas is injected cool as make-up to the reduction loop and the make-up mixture with the recirculating gas are heated before its injection to the reduction zone of the reactor. In this case the natural gas injection does help to reduce the size of the reforming unit.

OBJECTS OF THE INVENTION

As forementioned, an object of the present invention is to provide a process which permits operation with high iron content pellets, over 67%, at temperatures between 900° and 960° C. without agglomeration. Another object of the present invention is to provide a process that reduces the equivalent size of the reforming unit associated with the reduction reactor. This is significant, because the reforming unit is the most expensive equipment in a direct reduction plant.

BRIEF DESCRIPTION OF THE INVENTION

The preferred embodiment of this invention includes a moving bed reactor that comprises three zones. In the upper zone, the reduction of iron takes place with a reducing gas having a low content of methane gas, between 4 and 10%, and a high content of reducing components, namely, hydrogen and carbon monoxide, between 75 and 95%, and a reducing temperature of between 900° and 960° C. This reducing gas flow is in a closed loop with make-up reducing gas supplied from a separate reformer. The lower zone of the reactor is the cooling zone, which together with a quench cooler and a compressor is combined in a closed cooling loop. The gas composition of the make-up gas to the cooling loop preferably comprises a cooling gas with at least 75% methane content. A natural gas stream typically serves as the make-up to this loop. The amount of said natural gas make-up is between 1 and 2% that of the reducing gas stream (at the inlet of the reduction zone).

Between the reduction and cooling zones is the intermediate zone wherein, under controlled conditions, the mixing is promoted between a portion of the hot reducing gas coming from the reduction zone and the methane coming from the cooling zone. In this intermediate zone, methane reforming takes place absorbing a substantial amount of heat, which rapidly cools the solids and avoids the agglomeration of pellets having high metallic iron content.

By reforming within the reactor the methane injected to the cooling zone, the size of the reformer needed as the reducing gas generating unit is reduced.

DETAILED DESCRIPTION OF THE INVENTION

Figure 1:
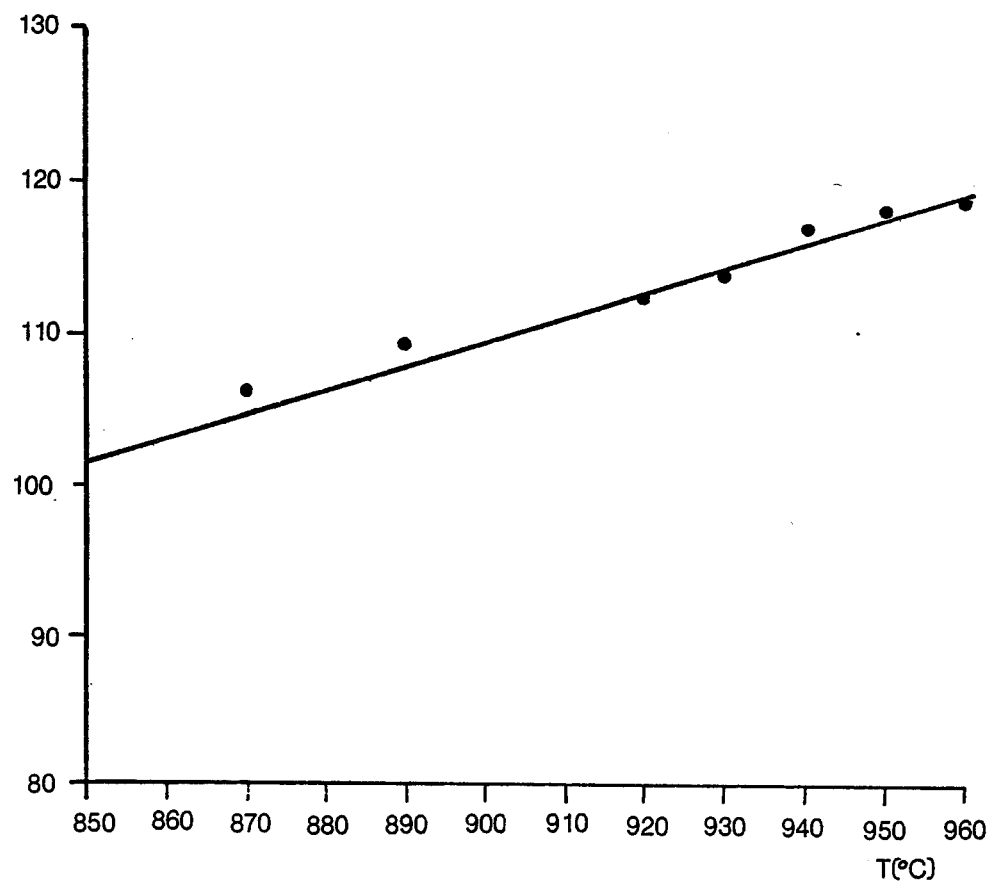
FIG. 1 shows the relation of the productivity of a direct reduction plant to the operating temperature.

FIG. 1 shows the temperature effect on productivity in a direct reduction plant of the type wherein the process according to the present invention can be used. As shown in this graph, the plant productivity is increased by 17% and the amount of reformed gas used is reduced, when reduction temperature rises between 850° and 960° C. So it is desirable to operate at high reduction temperatures. The principal problem when operating at high temperatures with pellets of high iron content, higher than 67%, is the agglomeration of these pellets when they are metallized. The presence of agglomerates causes disturbances in the solids flow and gas flow in the moving bed reactors used for the direct reduction of iron ore pellets. These disturbances cause operating problems that produce a low rate of utilization of the plant (i.e. loss in productivity) and a loss of control of the product quality (due to uneven mass flow, giving uneven treatment and thus, uneven product).

Figure 2:
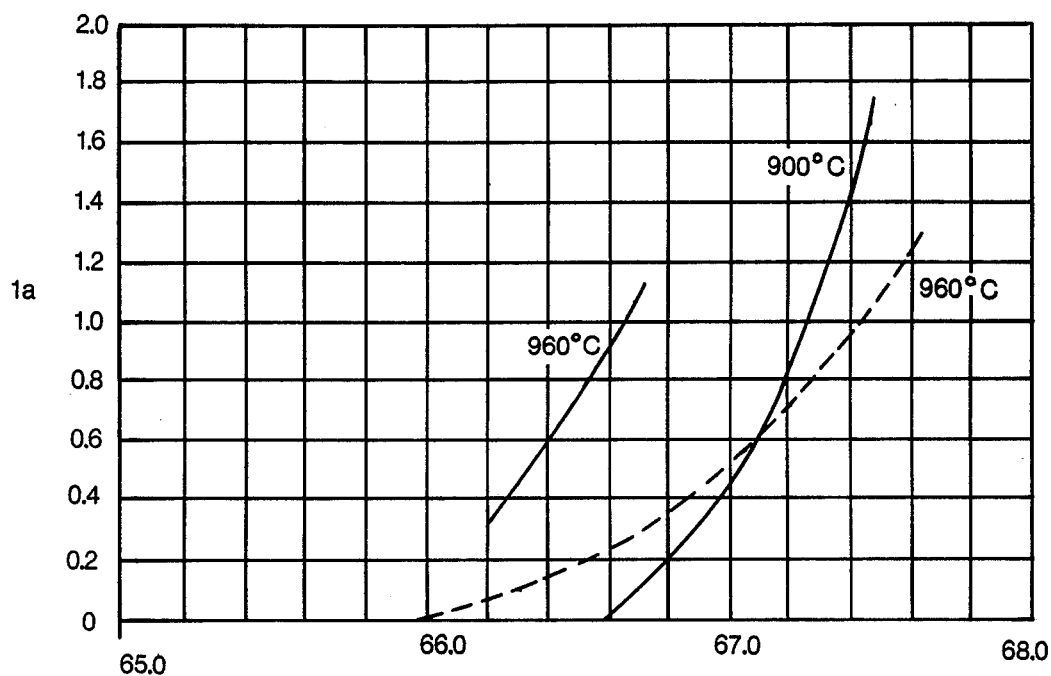
FIG. 2 is a diagram showing the effect of the iron content in pellets on the agglomeration index.

FIG. 2 shows the effect of the iron content of the charge on the formation of agglomerates, based on the so-called agglomerates index, Ia, defined as:

$$Ia = \frac{\ln Wa}{\ln Wb}$$

where:
Ia = Agglomerates index
Wa = Agglomerates weight during operation
Wb = Agglomerates weight during operation that causes problems in plant availability and product quality control.

In accordance with this definition, it is desirable that Ia always be lower than 1.0, this being the maximum value acceptable for stable operation of the plant without problems in solids and gaseous flow.

In FIG. 2, three curves are shown, two continuous full curves of the process without natural gas injection operating at 900° and at 960° C., and a dotted curve of the process operating at 960° C. according to the present invention with natural gas injection.

According to this information, in order to operate the plant at 960° C. without natural gas injection and without operation problems, it is required that the iron content in pellets be lower than 66.6%; or alternatively, to lower temperature to 900° C. if it is desired to operate with pellets with an iron content higher than 67%; in order to get a Ia lower than 1%.

In contrast, when making use of the process according to the present invention, it is possible to operate at 960° C. with high iron content pellets on the order of 67.5% without severe agglomeration problems. This process gives high plant productivity as well as a superior product quality, with high metallization and low fines generation by permitting use of a charge of pellets of high iron content, as contrasted with the use of non-pelletized lump ore.

According to FIG. 2, in order to operate the process with pellets having a 67.4% iron contents without natural gas injection, it is necessary to lower the temperature to the order of 900° C., losing 10% in productivity.

When injecting natural gas to the cooling zone, it is possible to move favorably to the right the curves Ia vs. T at 960° C., due to a sudden cooling of the hot reduced material and also due to minimized time during which the reduced particles stay at high temperature. This sudden cooling is chiefly caused by the ascending flow of the methane injected to the closed cooling loop and particularly, by the methane reformation with the oxidant elements of the gas that enters from the reduction loop, a portion of which is mixed in the intermediate zone of the reactor, promoting the endothermic reactions of reforming:

$$CH_4 + H_2O \rightarrow CO + 3H_2 \quad (1)$$

$$CH_4 + CO_2 \rightarrow 2CO + 2H_2 \quad (2)$$

The hot reducing gas that enters the reduction loop has a carbon dioxide content between 2 and 15% and a moisture content between 1 and 4%. These oxidant elements are used for the reformation that takes place in the intermediate zone of the reactor.

Figure 3:
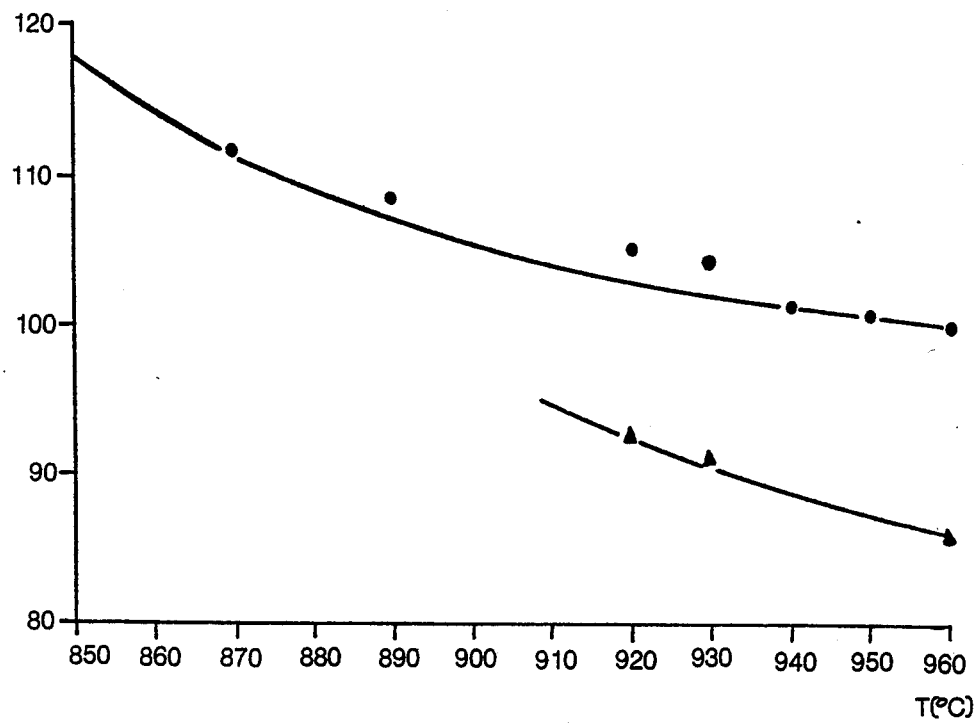
FIG. 3 shows the effect of the operating temperature on the required size of the reducing gas generating unit for two different cases, one with natural gas injection to the cooling loop, another without such injection.

FIG. 3 shows the effect of temperature and the natural gas injection on the capacity of the reformer of the reduction plant. For an operating temperature of 960° C., the natural gas injection process requires a reformer approximately 15% smaller than the process without the natural gas injection.

In the direct reduction processes based on natural gas there are generally two uses for natural gas. A portion of natural gas is fed to a catalytic reformer to convert hydrocarbons to mixtures of hydrogen and carbon monoxide to be used as reducing elements in the direct reduction of iron ore. Another portion of natural gas is used as a fuel to generate the necessary heat to perform the endothermic reactions of reformation and also for the heating of reducing gases before its injection to the reduction reactor.

Generally, the natural gas used as a fuel is mixed with the gas stream purged from the process having a low reducing power but still being usable as a fuel. This second stream of natural gas is used to upgrade the purge of process gas to be used as a fuel for the heater and the reformer of the process.

In the process according to the present invention, a portion of natural gas is injected to the cooling loop. In this loop the natural gas enhances the product cooling due to its high calorific capacity, consequently cooling is quicker and more efficient.

Since the cooling loop is a closed loop, the injected natural gas flows upwardly through the reactor to the intermediate zone wherein it is contacted with a portion of the hot reducing gas promoting the reformation of a portion of this natural gas as aforementioned.

When reforming the methane inside the reactor, reducing elements are produced which are used in the reduction zone to make said reduction more efficient (further decreasing the reformer capacity requirements).

The unreformed methane in the intermediate zone flows to the reduction zone functioning as a heat carrier element contributing to accelerate the heating of the iron oxides that is carried out in the reduction zone.

Finally, this methane (mixed with hydrogen, carbon monoxide, carbon dioxide, and moisture) leaves the reactor, and a portion of this mixture leaves the process as purge gas, which is used as a fuel.

In short, the methane injected to the cooling loop provides a series of benefits in the process: improves the product cooling in the cooling zone, avoids the pellets agglomeration by means of a sudden endothermic cooling in the intermediate zone, decreases the reformer capacity requirement due to the reformation that is performed in the intermediate zone, serves in the reduction zone as a heat carrier, and finally, enriches the mixture of purge gas to be used as a fuel in the reformer and heater burners.

It is important to point out that all of these benefits are achieved only in the process according to the present invention, because it has a reformer outside of the reduction loop and a heater for the reduction inlet gas going into the reduction zone.

In processes with stoichiometric reformers and without a heater for the recycled gas stream, as those disclosed in the aforesaid patents, it is not possible to have the benefit of diminishing the reformer size needed by injecting natural gas to the cooling loop, because the flow of hot gas from the reformer can not be diminished without lowering the temperature at the inlet of the reduction zone thus decreasing the productivity of the plant.

When the reformer is located within the reduction loop, methane injected to the cooling loop eventually reaches the reformer and therefore in this case the benefit of diminishing the reformer capacity cannot be achieved.

It is evident that the benefits of diminishing the reformer capacity derived from the present invention are independent of the reactor charge, be it in the form of pellets, lump ore, or a mixture of both.

Figure 4:
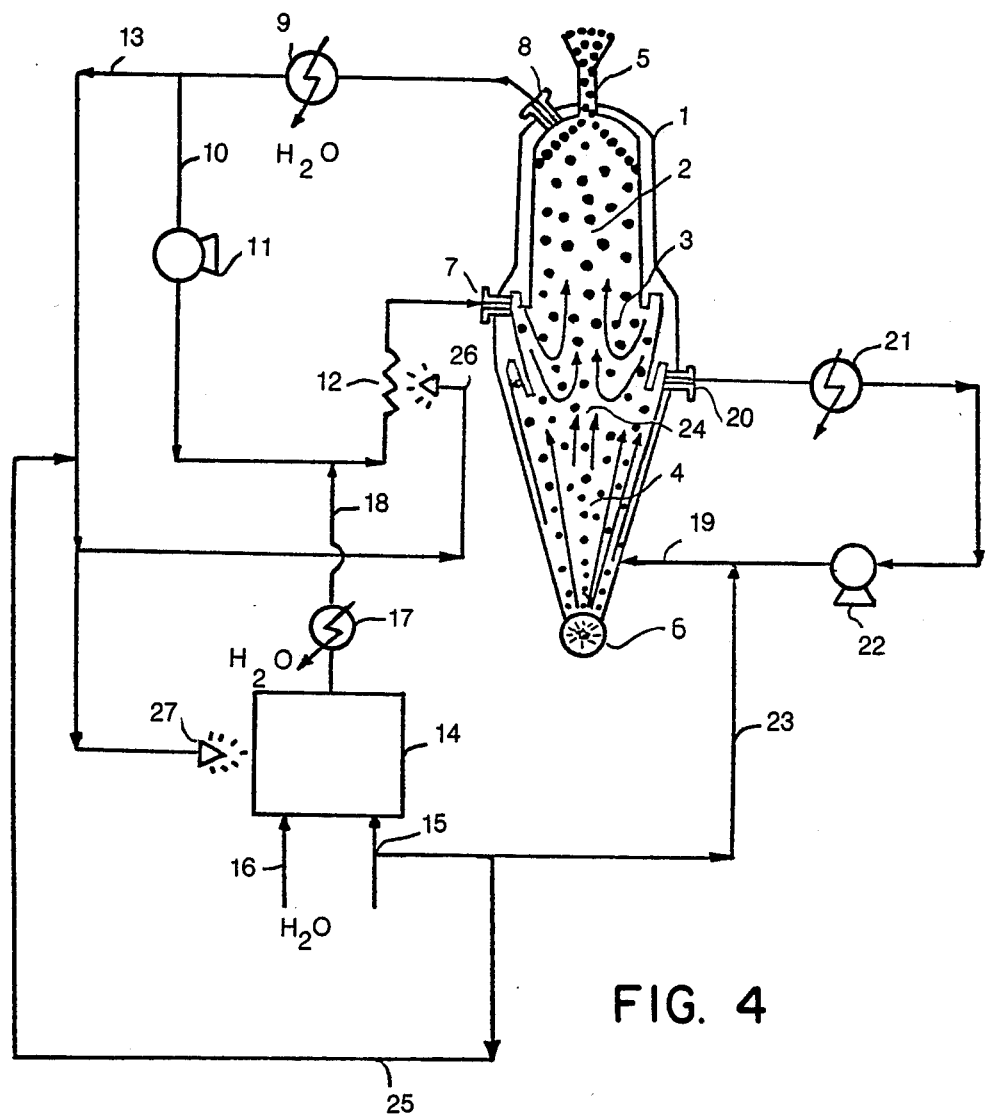
FIG. 4 is a schematic diagram of a preferred embodiment of a process according to the present invention.

FIG. 4 shows the preferred embodiment of the process which achieves the objectives of the present invention.

Reduction of iron ore takes place in a moving bed reactor designated with numeral 1, which comprises three zones, a reduction zone 2, an intermediate zone 3, and a cooling zone 4. It is preferably operated at somewhat above atmospheric pressure, e.g. typically at 5 kg/cm. Iron ore is continuously charged to reactor 1 through a feed duct 5, and the ore flows by gravity through the three zones of the reactor. The velocity of solids flow is controlled by means of a rotary valve 6, located at the bottom of the reactor. By controlling the solids flow, this valve also controls the residence time of solids and the production of the reactor.

In the lower portion of the reduction zone 2, a reducing gas is injected through pipe 7 at a temperature between 900° C. and 960° C. This gas is part of a first gas stream forming a reducing gas loop. This stream flows upwardly through the reduction zone 2 where it contacts the descending solids. When the hot gas contacts the iron ore, the reduction of aforesaid material is carried out.

The reducing gas leaves the reactor at its upper portion through the reduction zone outlet pipe 8. It is cooled in a quench cooler 9 where the water formed by the reduction reaction with hydrogen is removed by condensation. In this way the reducing power of the gas effluent from the reactor is increased.

The gas effluent from the quench cooler 9 is divided into two portions. One portion is recirculated as the first gas stream through pipe 10 by means of a compressor 11 and then through a heater 12 and back to the point of injection of hot reducing gas via inlet pipe 7 into the lower portion of the reduction zone 2.

The other portion of the gas effluent from cooler 9 is forwarded via pipe 13 to the fuel header to be used as a fuel in the burners of the heater 12 and the reformer 14, as mentioned below. The recirculated first gas stream, before passing through the heater 12, is mixed with a cool reformed gas (identified as a fifth gas stream) coming from the reformer 14. In the reformer 14 the catalytic conversion of natural gas and steam is carried out producing a gas mixture mainly composed of hydrogen and carbon monoxide. A stream of natural gas from pipe 15 and a stream of steam from pipe 16 are fed to the reformer to carry out the aforesaid catalytic conversion. The reformer 14 is a typical one that uses a nickel catalyst to promote the reformation of the methane contained in the natural gas. In order to protect the catalyst of the reformer 14 against an excessive carbon deposition, this kind of equipment is generally operated with an excess of steam in respect to the amount stoichiometrically required to carry out the reforming reaction. Since this steam is an undesirable element in the make-up reducing gas for the reduction system, it is required to remove unreacted steam from the gas effluent of the reformer 14. For this purpose, a quench cooler 17 is used; which provides said fifth gas stream via pipe 18 substantially free of water and having a high content of hydrogen and carbon monoxide. This make-up gas stream from pipe 18 is mixed with the recirculated gas from pipe 10 and is fed to heater 12 wherein its temperature is raised before its injection to reduction zone 2.

In the lower portion of the cooling zone 4, a cool gas stream is injected via inlet pipe 19 and flows upwardly countercurrently to the descending solids. This cooling gas is part of a second gas stream forming a cooling gas loop. The cooling gas exits the reactor 1 through the cooling zone outlet pipe 20, located at the upper portion of the cooling zone 4. It is then cooled in quench cooler 21. The cooled second gas stream is then recirculated in a closed loop via pipe 19 to the lower portion of the cooling zone 4 by means of a compressor 22.

A cool natural gas is injected as a third gas stream via pipe 23, serving as a make-up to the cooling loop, merging with the recirculated cooling gas from the cooler 21, which mixture is then injected to the cooling zone 4. Since the cooling loop is a closed loop, a portion of stream injected via pipe 19 flows internally from cooling zone 4 to intermediate zone 3 as a fourth stream as indicated by arrows 24. In the intermediate zone 3, the methane flowing up from cooling zone 4 is contacted with the oxidizing elements present in the hot reducing gas stream from pipe 7 promoting the reforming of a portion of the injected methane.

It is important to point out that third gas stream introduced via pipe 23 must be small as compared with the first gas stream injected via pipe 7 in order not excessively to cool the reducing gas and adversely affect the reduction reactions in the reduction zone 2. In the process according to the present invention, the flow rate of the third gas stream through pipe 23 has a value between 1 and 2% of the first gas stream through pipe 7. In addition to natural gas through pipes 15 and 23 (both used in the process, the first one injected to the reformer 14 and the second one to the cooling loop of the reactor 1) there is another natural gas stream through pipe 25 that is used as a fuel. The aforesaid through pipe 25 is mixed with the purge gas stream from pipe 13. This mixture is used to provide the necessary heat to burners 26 of heater 12 and to burners 27 of reformer 14. It should be obvious to those skilled in the art that there are modifications to the preferred embodiment that still fall within the spirit of the present invention. Modifications such as including a $CO_2$ absorption unit to scrub $CO_2$ from stream in pipe 10 and also to utilize a portion of stream from pipe 18 as a minor part of the make-up to the cooling loop, may be considered within the spirit of the invention in its broader aspects. It should also be considered within the spirit of the present invention to heat only the stream from pipe 10 and to mix it hot with a hot reducing gas stream coming from the reformer.

We claim:

1. A process for reducing particulate iron ore to sponge iron in a vertical shaft, moving bed reactor having a reduction zone in the upper portion of said reactor with an inlet in the lower portion of said zone and an outlet in the upper portion of said zone and further having a cooling zone similarly with a lower inlet and upper outlet, comprising
   (a) feeding iron ore to said reduction zone,
   (b) forming a reducing gas loop by feeding to said reduction zone inlet as a first gas stream a hot reducing gas composed largely of carbon monoxide and hydrogen and also containing water and carbon dioxide, causing said reducing gas to flow upwardly through said reduction zone to reduce the iron ore therein to sponge iron, withdrawing reducing gas from the reduction zone via said outlet as an effluent gas, cooling the effluent gas and removing water therefrom, heating and recycling at least a portion of said effluent gas to said reduction zone inlet to complete said reducing gas loop,
   (c) forming as a second gas stream a cooling gas loop by causing a cooling gas containing a substantial amount of methane with at most only a small amount of carbon dioxide and water relative to said latter methane to flow upwardly through said cooling zone to cool the sponge iron therein, withdrawing a portion of the cooling gas from the cooling zone outlet as an effluent gas, cooling the latter effluent gas and removing water therefrom, and recycling the resulting cooled gas to the cooling zone inlet,
   (d) feeding to said cooling gas loop as a make-up gas a third gas stream largely composed of methane with at most only a small amount of carbon dioxide and water relative to said latter methane,
   (e) causing a portion of said second stream to form a fourth gas stream similarly containing a substantial amount of methane that flows upwardly from said cooling zone to said reduction zone and mixes with said first gas stream adjacent said reduction zone inlet,
   (f) feeding to said reducing gas loop as a make-up gas a fifth gas stream mainly composed of hydrogen and carbon monoxide, and
   (g) discharging cooled reduced iron ore in the form of sponge iron from said cooling zone,
   whereby methane in said fourth stream is mainly reformed endothermically adjacent said reduction zone inlet by the carbon dioxide and water present in said first gas stream and thus initiates an early and rapid cooling of the descending reduced ore particulates at the point of mixing, thus decreasing the tendency of the reduced ore particles to agglomerate, and also, decreasing the amount of externally generated reducing make-up gas needed for the reducing gas loop.

2. A process according to claim 1, wherein said first gas stream is injected into the reducing zone at a temperature of between 900° and 960° C.

3. A process according to claim 2, wherein the methane content of said third gas stream is at least 75%.

4. A process according to claim 3, wherein the methane content in said first gas stream is between 4 and 10% by volume.

5. A process according to claim 4, wherein the water content in said first gas stream when injected into said reduction zone is between 1 and 4%, and the carbon dioxide content is between 2 and 15%.

6. A process according to claim 5, wherein said third gas stream flow rate in terms of its methane content is between 1 and 2% volume of the total flow rate of said first gas stream.

7. A process according to claim 6, wherein the charged ore to said reactor is in the form of pellets with an iron content higher then 67% weight.

8. A process according to claim 7, wherein said first stream when injected into said reduction zone is a mixture of recirculated gas from said reduction zone and make-up gas from a catalytic reformer.

9. A process according to claim 6, wherein the third gas stream is essentially only natural gas.

10. A process according to claim 1, wherein the third gas stream is essentially only natural gas.

11. A process according to claim 1, wherein carbon dioxide is scrubbed from the recirculated gas stream.

12. A process according to claim 8, wherein carbon dioxide is scrubbed from the recirculated gas stream.

13. A process according to claim 1, wherein the methane content in said first gas stream is between 4 and 10% by volume.

14. A process according to claim 1, wherein the water content in said first gas stream is between 1 and 4%, and the carbon dioxide content is between 2 and 15%.

15. A process according to claim 1, wherein said third gas stream flow rate in terms of its methane content is between 1 and 2% volume of the total flow rate of said first gas stream.

16. A process according to claim 1, wherein the charged ore to said reactor is in the form of pellets with an iron content higher then 67% weight.

17. A process according to claim 1, wherein the methane content of said third gas stream is at least 75%.

18. A process according to claim 17, wherein the charged ore to said reactor is in the form of pellets with an iron content higher then 67% weight.

19. A process according to claim 18, wherein said third gas stream flow rate in terms of its methane content is between 1 and 2% volume of the total flow rate of said first gas stream.

20. A process according to claim 19, wherein the methane content in said first gas stream is between 4 and 10% by volume; the water content in said first gas steam is between 1 and 4%, the carbon dioxide content is between 2 and 15% and said third gas stream is composed essentially of natural gas.

* * * * *